United States Patent [19]
Ito

[11] Patent Number: 5,371,614
[45] Date of Patent: Dec. 6, 1994

[54] IMAGE SCANNER FOR FILM
[75] Inventor: Takuro Ito, Shizuoka, Japan
[73] Assignee: Tokyo Electric Co., Ltd., Tokyo, Japan
[21] Appl. No.: 603,367
[22] Filed: Oct. 26, 1990
[51] Int. Cl.⁵ .............................................. H04N 1/04
[52] U.S. Cl. .................................. 358/487; 358/488; 358/496; 353/114
[58] Field of Search ............... 358/487, 488, 496, 498, 358/214, 482, 483; 353/114, 120, 95; 352/174, 141

[56] References Cited
U.S. PATENT DOCUMENTS

| | | | |
|---|---|---|---|
| 3,711,195 | 1/1973 | Gehlert et al. | 353/116 |
| 3,847,473 | 11/1974 | Sobotta | 353/114 |
| 4,313,675 | 2/1982 | Ackeret | 353/114 |
| 4,379,627 | 4/1983 | Naël | 353/114 |
| 4,641,190 | 2/1987 | Ohta et al. | 358/488 |
| 4,642,700 | 2/1987 | Ohta et al. | 358/488 |
| 4,829,371 | 5/1989 | Hiramatsu et al. | 358/75 |
| 4,858,003 | 8/1989 | Wirt et al. | 353/95 |
| 4,953,547 | 9/1990 | Mita | 358/482 |
| 4,974,956 | 12/1990 | Keightley | 353/114 |
| 5,072,311 | 12/1991 | Hiramatsu et al. | 358/488 |
| 5,107,350 | 4/1992 | Omori | 358/498 |
| 5,132,809 | 7/1992 | Kikuchi et al. | 358/214 |

Primary Examiner—Richard Hjerpe
Assistant Examiner—Thomas L. Stoll
Attorney, Agent, or Firm—Oblon, Spivak, McClelland, Maier & Neustadt

[57] ABSTRACT

According to the present invention, a film which has been inserted into a film insertion opening of a support is conveyed toward the inner part reciprocatably by a conveyance means; light is emitted from a light source and is allowed to pass through the film being conveyed; the light which has passed through the film is refracted along the film conveying direction by a refractor; and the light thus refracted by the refractor is received by an optical reader, which reads an image formed on the film. This construction permits the reduction in size of the entire apparatus.

9 Claims, 8 Drawing Sheets

IMAGE SCANNER FOR FILM

FIELD OF THE INVENTION AND RELATED ART STATEMENT

The present invention relates to an image scanner capable of radiating light to an object to be read and optically reading an image formed on the object, and particularly to an image scanner for film capable of reading an image formed on a light-transmitting film.

An example of a conventional apparatus of this type is illustrated in FIGS. 10 to 12. Film 51, which is an object to be read, is held at its peripheral portion by a cardboard frame 52 to constitute a slide 50. FIG. 10 shows an internal structure of an apparatus for reading an image formed on the film 51.

A holder 101 for holding the slide 50 removably is provided. The holder 101 has four connecting legs 101a, through which it is connected to a carrier 100. Further, the holder 101 is provided with a plate spring (not shown) for pressing the slide 50 and positioning it within the holder.

The carrier 100 is slidably mounted on two carrier shafts 102 which are disposed horizontally in parallel with each other. There is provided a drive portion including a step-motor (not shown) for driving the carrier 100 on the carrier shafts 102. Halfway in the connection between the step-motor and the carrier there is provided a reduction gear for reducing the number of revolutions of the step-motor. Further, in the sliding direction of the carrier 100 there is provided a limit switch (not shown) for detecting a stopped position of the carrier.

In the horizontal direction perpendicular to the sliding direction of the carrier 100 and on one side of the carrier there is disposed a light source 103 through a diffuser panel 104 which diffuses light, while on the other side of the carrier 100 there is disposed a line type image sensor 106. The line direction of the image sensor 106 is perpendicular to the moving direction of the carrier 100.

FIGS. 11 and 12 illustrate an external construction of the apparatus as seen in different directions. A case 107 of the apparatus has a shape wherein two convex portions 109 and 110 are formed contiguously on both sides of a concave portion 108. In one convex portion 109 there are accommodated the carrier 100 and related parts thereof as well as the diffuser panel 104 and the light source 103, while in the other convex portion 110 there are accommodated a lens 105 and the image sensor 106. The holder 101 provided on the carrier 100 is disposed in the concave portion 108 so that the slide 50 can be loaded and removed from the exterior of the case 107. Guide slots 111 for passing therethrough the connecting legs 101a of the holder 101 for the carrier 100 are formed in the wall surface of the convex portion 109 along the moving direction of the carrier.

For reading an image formed on the film 51 in such structure, the slide 50 is held by the holder 101. At this time, the slide 50 is positioned in the holder 101 by the plate spring provided in the holder. Then, the carrier 100 is slide along the carrier shafts 102 by the drive portion and at the same time the light source 103 is operated to emit light. The light from the light source 103 is diffused by the diffuser panel 104 and passes through the film 51 in the slide 50 held by the holder 101, then passes through the lens 105 and is thereby focused on the image sensor 106 in the line direction of the sensor, i.e., in Z direction in FIG. 10. The image on the film 51 is read by the combination of transmitted light through the film in the Z direction and that in Y direction in FIG. 10 which corresponds to the sliding direction of the carrier 100.

The movement in the Y direction of the transmitted light through the film 51 on the image sensor 106 is done by sliding the carrier 100. At this time, the number of revolutions of the step-motor which drives the carrier 100 is greatly reduced by the reduction gear, whereby the amount of movement of the carrier 100 is made very small. This is for the following reason. Because of the structure of detecting the transmitted light through the film 51, the image sensor for film can read the image on the film 51 precisely, so there is used the image sensor 106 of high resolution whereby the reading density in the Z direction is enhanced, and hence it is necessary to render the density high also in the Y direction.

A reading start position of the film 51 is set by moving the carrier 100 by a predetermined distance with respect to a stopped position of the carrier detected by the limit switch.

Further, shading correction is made prior to reading the image on the film. According to one method for shading correction, the light from the lamp 103 is focused on the image sensor 106 directly without passing it through the film 51 prior to reading the image on the film, and on the basis of an output which is provided at this time from the image sensor 106 there is made shading correction. According to another method, shading correction is made before shipping of the apparatus from the manufacturer and correction data are written in a RAM provided within the scanner body, then the correction data are accessed from the RAM prior to reading to correct the output of the image sensor 106.

The following description is now provided about problems involved in the above conventional methods.

Firstly, it is absolutely necessary for the case 107 to have the concave portion 108 because the loading and removal of the slide 50 with respect to the holder 101 must be done in front of the lens 105, and since the convex portions 109 and 110 are formed on both sides of the concave portion 108, the case 107 is large-sized. Consequently, a large space is required for mounting the case 107 into an electronic machine, and the degree of freedom for the position where the case is to be disposed is low.

Secondly, in the structure of the conventional apparatus the presence of the concave portion 108 is indispensable for the case 107, so the lens 105 is exposed to the exterior. Consequently, not only the light from the light source 103 passing through the image but also external light is incident on the lens 105, which external light affects the reading accuracy. Besides, the lens 105 is apt to be damaged because of the incidence of external light.

Thirdly, the slide 50 is not positioned accurately within the holder 101, resulting in that the reading accuracy for the film 51 is deteriorated. The reason why the positioning of the slide 50 cannot be done accurately is that the plate spring provided within the holder 101 does not satisfy the conditions required for fulfilling the function of fixing the slide 50 accurately. More particularly, as the first condition, the plate spring is required to come into flatwise contact with the surface of the slide 50 over a certain area and contact the slide closely with the holder 101. As the second condition, the plate spring is required to have a certain or stronger pressing force to prevent movement of the slide 50 in the course of movement of the carrier 100. For satisfying the first condition, it is necessary to use a complicated shape of a plate spring having a flat pressing surface for pressing the slide 50 and also having an elastic portion capable of being deformed freely for contacting the pressing surface flatwise with the slide 50. In such a complicated shape, however, a bent portion is apt to be cracked, so the manufacture of such a plate spring is difficult unless there is used a material having a small wall thickness. But if the plate thickness is made small, it will become impossible to obtain a desired pressing force. Thus, it is difficult to obtain a plate spring which satisfies both conditions mentioned above, and hence it is difficult to position the slide 50 accurately within the holder 101.

Fourthly, it is difficult to set a reading start position of the film 51 accurately. More particularly, in order to make the amount of Y-slide of the carrier 100 very small it is necessary to provide a plurality of gears in the reduction gear to increase the reduction ratio. But this results in great influence of backlash of the gears and hence the movement error of the carrier 100 becomes larger. Consequently, the reading start position of the film 51 shifts by several to several ten picture elements. Further, since the reading start position is set on the basis of the stopped position of the carrier 100 detected by the limit switch, unless the mounting position of the limit switch is determined precisely and unless there is used a limit switch of low hysteresis in opening and closing of a contact, the variations in the reading start position becomes larger. These points result in difficult manufacture and increased cost of components.

Fifthly, where it is desired to reduce the size of the apparatus, the optical path length becomes smaller, so the change in the imaging magnification caused by positional variations among the film 51, lens 105 and image sensor 106 becomes larger. Since a limit is encountered in determining the positions of these components accurately, the magnification accuracy is deteriorated as compared with that in conventional image scanners for reading originals.

Sixthly, in the case where prior to reading the image on the film 51 the light from the lamp 103 is focused on the image sensor 106 directly to make shading correction, it is necessary that the loading and removal of the slide 50 should be done at every shading correction. This operation is troublesome.

Seventhly, it is difficult to make shading correction with a high accuracy. More particularly, the quantity of light emitted from the lamp 103 and the sensitivity of the image sensor 106 are apt to vary according to environmental changes such as a change in temperature, and if a certain or longer time has elapsed after shading is made until actual reading is performed, there will occur a change of an appropriate correction value. Therefore, in the case where the light from the lamp 103 is focused on the image sensor 106 directly prior to reading the image on the film 51 to make shading correction, it is required to perform an actual reading immediately after shading correction, or else the shading correction accuracy will be deteriorated. Further, in the method wherein shading correction is made before shipping of the apparatus and correction data are written in a RAM, then the correction data accessed before reading the image on the film 51 and the output of the image sensor 106 is corrected on the basis of the correction data, a shading correction of high accuracy cannot be expected from the beginning.

Eighthly, it is difficult to make a proper shading correction. More particularly, the quantity of light incident on the image sensor 106 is decreased 50% to 60% even at the portion of the highest transmissivity in the case of the light transmitted through the film 51 as compared with the light incident directly from the lamp 103. Therefore, if a shading correction value is set using as an appropriate value the gain of the image sensor 106 when the transmitted light through the film 51 is incident thereon, since at the time of shading correction the light from the lamp 103 is made incident on the image sensor 106 directly as described above, the quantity of light is too large, so that the output of the image sensor 106 is saturated and the correction basis becomes vague. Conversely, if a shading correction value is set using as an appropriate value the gain of the image sensor 106 when the light from the lamp 103 is received by the image sensor directly at the time of shading correction, the quantity of light becomes insufficient at the time of reading the image on the film 51, so that the S/N ratio becomes lower and the gradation accuracy is deteriorated. Consequently, it is difficult to make an appropriate shading correction.

OBJECTS AND SUMMARY OF THE INVENTION

It is a first object of the present invention to provide an image scanner for film which permits the reduction in size of the entire apparatus.

It is a second object of the present invention to provide an image scanner for film capable of shielding an image sensor and a lens from external light.

It is a third object of the present invention to provide an image scanner for film capable of positioning a film accurately.

It is a fourth object of the present invention to provide an image scanner for film capable of setting a film reading start position accurately.

It is a fifth object of the present invention to provide an image scanner for film capable of enhancing the magnification accuracy of an optical system.

It is a sixth object of the present invention to provide an image scanner for film not requiring troublesome operations for shading correction.

It is a seventh object of the present invention to provide an apparatus capable of making an appropriate correction with a high accuracy.

According to the present invention, in order to achieve the above-mentioned objects, there are provided a support having a film insertion opening; a conveyance means for conveying a film which has been inserted into the film insertion opening, toward the inner part from the same opening reciprocatably; a light source for radiating light to the film being conveyed by the conveyance means, in a direction perpendicular to the film conveying direction; a refractor for refracting the light which has been emitted from the light source and passed through the film, along the film conveying direction; and an optical reader for receiving the light which has been refracted by the refractor and reading an image formed on the film. In this construction, the image on the film can be read by causing the transmitted light through the film to be received by the image sensor while the film inserted from the film insertion opening is conveyed by the conveyance means. Since the optical path is refracted by the refractor, it is shorter in the direction perpendicular to the film, and since the optical path after the refraction extends along the film conveying direction, the expansion in size of the apparatus in that direction is not so large, so that the reduction in size of the entire apparatus can be attained, and the apparatus can be disposed in a small space when mounted as a system in an electronic equipment. Further, in the case where the entire apparatus is covered with a case to shield the apparatus from light, it is possible to eliminate the influence of external light upon the reading accuracy and it is also possible to hide all the components of the optical reader in the interior of the support to protect them from the external light.

Also, according to the present invention, in order to achieve the foregoing objects, the conveyance means is constituted by a movable member which can move from the film insertion opening toward the inner part reciprocatably and which has a holder portion for removably holding the film inserted from the film insertion opening. Therefore, in the case where the holder portion of the movable member is constituted by a receptacle portion for supporting the peripheral edge of the film, a first plate spring one end of which is attached to the movable member so as to be capable of rising and falling, and a second plate spring which is smaller in thickness than the first plate spring, the second plate spring having elastic portions fixed at one end thereof to the first plate spring and flat pressing surfaces which are contiguous to the other end of the elastic portions and come into elastic contact with both sides of the receptacle portion, the film can be pressed against the receptacle portion under a strong pressing force induced by the first plate spring and it can be brought into close contact with the receptacle portion by the pressing surfaces of the second spring, whereby the film can be positioned accurately and surely. In the case where a reading start time setting means is provided in the movable member wherein a light transmission window is formed in a position innerer than the holder portion with respect to the film insertion opening and through which the light from the light source passes, and a reading start position is set on the basis of a change in the output of the image sensor when the light transmission window passes across the optical axis of the light source, it is possible to set a reading start time accurately without being influenced at all by a dimensional error, etc. of each component. In the case where there is provided a magnification correcting means which uses as a correction basis the output of the image sensor corresponding to the light from the light source which passes through the foregoing light transmission window, the magnification correction can be done accurately always just before the start of reading on the basis of an actual position of the optical system or the image sensor. Further, in the case where there is provided a shading correction means which uses as a correction basis the output of the image sensor corresponding to the light from the light source which passes through the light transmission window, not only the complicated operation for shading correction is no longer required but also shading correction can be done accurately on the basis of such conditions as the quantity of light emitted from the light source the moment the image on the film is read, the reflectivity of the optical system and the sensitivity of the image sensor. In the case where there is provided a light quantity changing means for changing the quantity of light emitted from the light source or a filter having an equal transmissivity to that of the transparent portion of the film is attached to the light transmission window, the quantity of light which is incident on the image sensor directly at the time of shading correction and the quantity of light which is incident on the image sensor through the transparent portion of the film at the time of image reading become equal to each other, whereby appropriate shading correction is performed and it is possible to enhance the S/N ratio during image reading. Moreover, in the case where there is provided an output changing means for changing the output of the image sensor, the output of the image sensor during shading correction and that during image reading from the film become equal to each other, whereby there is performed an appropriate shading correction and a high S/N ratio can be obtained during image reading.

DESCRIPTION OF PREFERRED EMBODIMENTS

Figure 1:
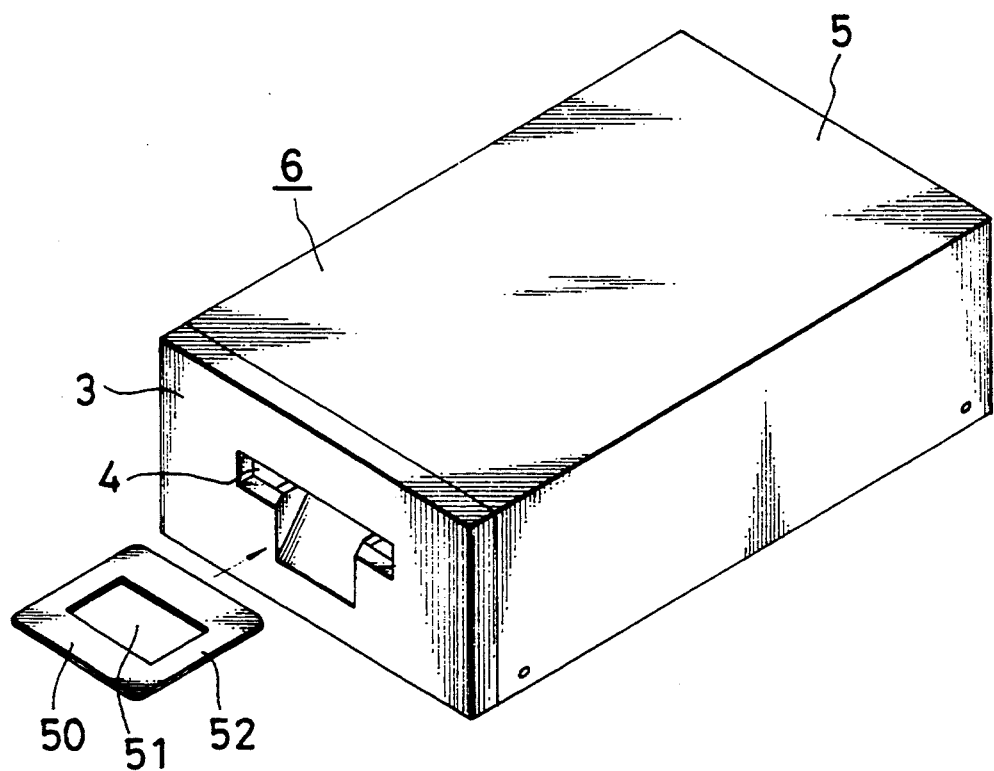
FIG 1 is a perspective view of the whole of an image scanner for film according to an embodiment of the present invention.

A first embodiment of the present invention will be described below with reference to FIGS. 1 to 9. As to a slide 50, an explanation thereof will be omitted, using the same reference numeral as in the foregoing description of the prior art.

Referring first to FIG. 1, there is illustrated an external construction of the whole of an image scanner for film embodying the present invention. This apparatus is formed in the shape of a rectangular parallelopiped as a whole in which a cover 5 is attached to a support 1 which has a film insertion opening 4 for insertion of the slide 50 therethrough.

Figure 2:
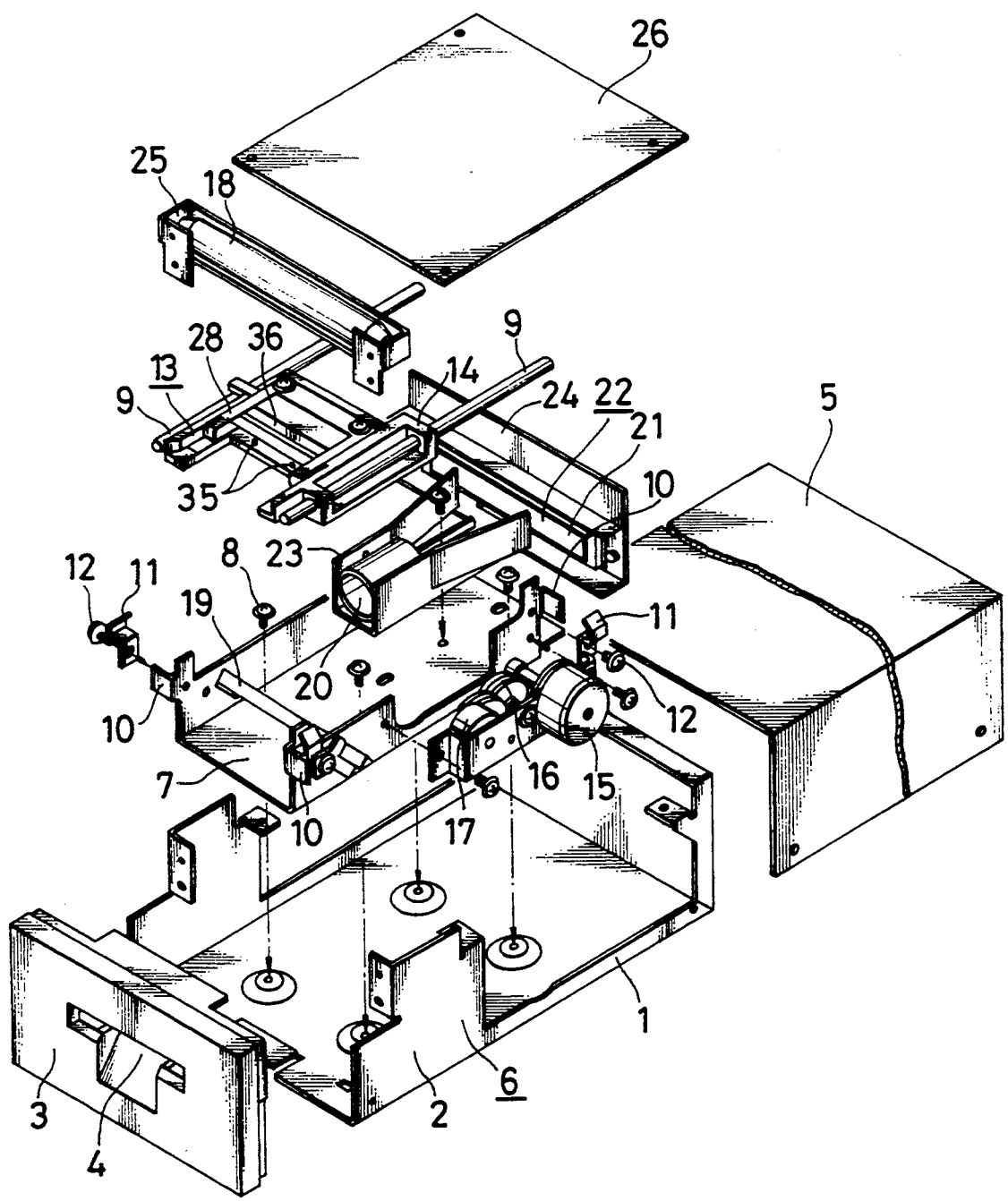
FIG. 2 is an exploded perspective view showing an internal structure thereof.

Referring next to FIG. 2, there is illustrated an internal structure of the image scanner. The support 1 comprises a base 2 whose front, side and upper faces are open and a front panel 3 which covers the front face of the base 2 and which is formed with the film insertion opening 4. The cover 5 is of a shape which covers both side faces and the upper face of the base 2. The base 2, the front panel 3 and the cover 5 are combined together to constitute a casing 6. Onto the bottom of the base 2 is fixed a carrier frame 7 with plural bolts 8, and on both sides of the carrier frame 7 there are formed support portions 10 for supporting carrier shafts 9. Further, fixing members 11 for pressing the carrier shafts 9 are attached to the support portions 10 each with a bolt 12.

Within the casing 6 is provided a conveyance means 13 for conveying the slide 50 reciprocatably toward the inner part of the film insertion opening 4. The conveyance means 13 comprises a carrier 14 as a movable member which is held on the carrier shafts 9 slidably, a step-motor 15, a gear 17 connected to the step-motor 15 through a speed reduction mechanism 16, and a rack (not shown) formed on one side of the carrier 14 and meshing with the gear 17. The step-motor 15, the speed reduction mechanism 16 and the gear 17 are mounted onto one side of the carrier frame 7. Also provided within the casing 6 are a lamp 18 as a light source and a mirror 19 as a refractor, as well as a converging lens 20 and an image sensor 21 both constituting an optical reader 22. The lamp 18 and the mirror 19 are disposed on an optical axis which is perpendicular to the conveyance direction of the carrier 14, while the converging lens 20 and the image sensor 21 are disposed on an optical axis which is refracted at a right angle by the mirror 19. More specifically, the lamp 18 is mounted to the carrier frame 7 through a lamp holder 25, and the mirror 19 is mounted to the carrier frame 7 so as to be adjustable in its angle. The converging lens 20 is mounted to an optoframe 23 which is mounted to the carrier frame 7 so as to be adjustable in its position in the optical axis direction. The image sensor 21 is mounted to the carrier frame 7 through a mounting plate 24. The numeral 26 denotes a printed circuit board mounted on the carrier frame 7.

Figure 3:
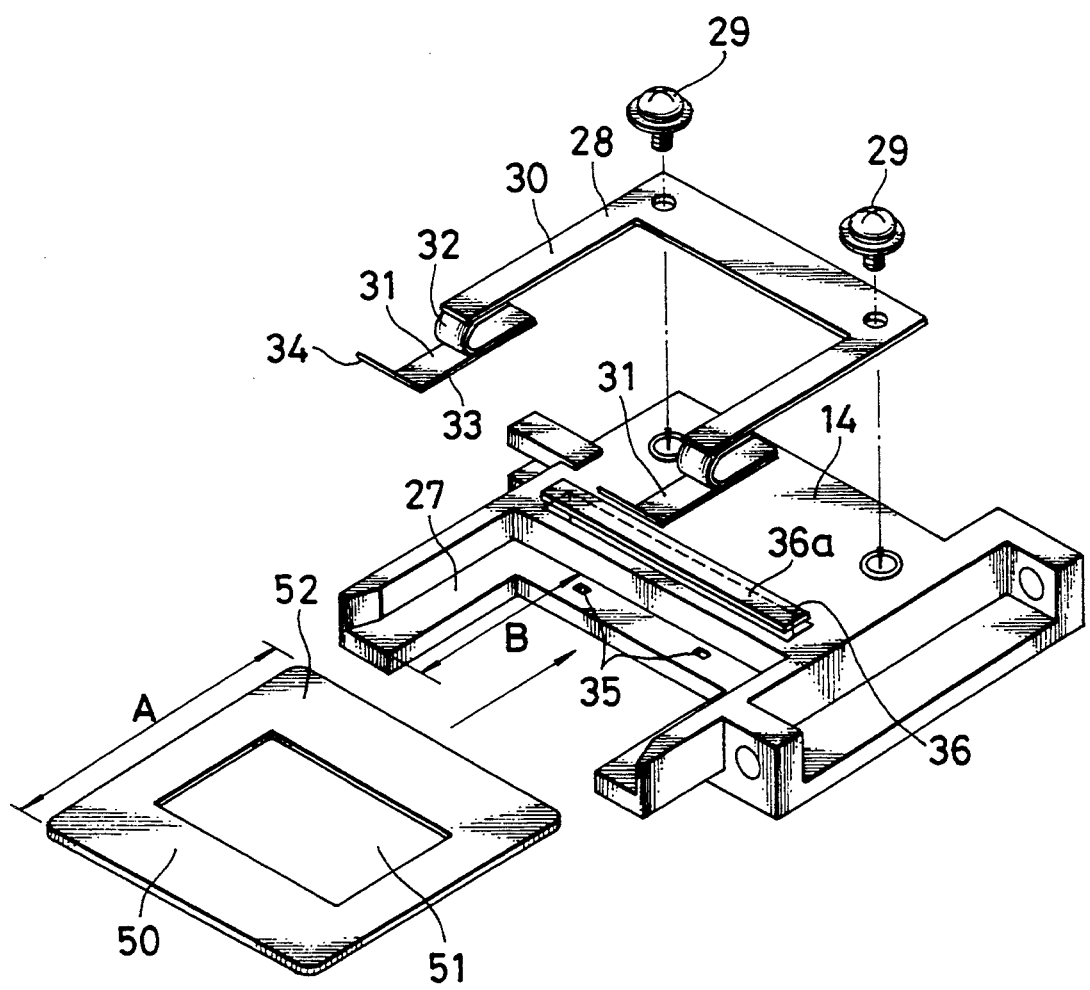
FIG. 3 is an exploded perspective view showing a slide holding structure.

Referring now to FIG. 3, there are illustrated the details of the carrier 14. The carrier 14 is formed with a holder portion 14a for holding the slide 50 removably. The holder portion 14a is composed of a U-shaped receptacle portion 27 for supporting three peripheral sides of a frame 52 and a pressing member 28 for pressing both sides of the frame 52 to the receptacle portion 27. The length B in the direction of the inner part of the receptacle portion 27 is set shorter than the length A of the frame 52. The pressing member 28 comprises a first plate spring 30 which is mounted to the carrier 14 with bolts 29 and a second plate spring 31 which is fixed on both sides of the first plate spring 30. The second plate springs 31, which are formed using a material thinner than the first plate spring 30, each have a U-bent elastic portion 32, a pressing surface 33 folded back from one end of the elastic portion 32 to press the frame 52 over a certain length, and an inclined surface 34 inclined upwards at an angle of 45 degrees or so from the front end of the pressing surface 33. In the carrier 14 there are formed a pair of right and left slide detecting apertures 35 in the portion of the carrier which supports the front edge of the frame 52 of the receptacle portion 27, as well as a laterally long light transmission window 36 positioned on the side innerer than the slide detecting apertures 35. In the light transmission window 36 is fitted a filter 36a having a transmissivity (50-60%) set equal to that of a transparent portion of a film 51.

Figure 7:
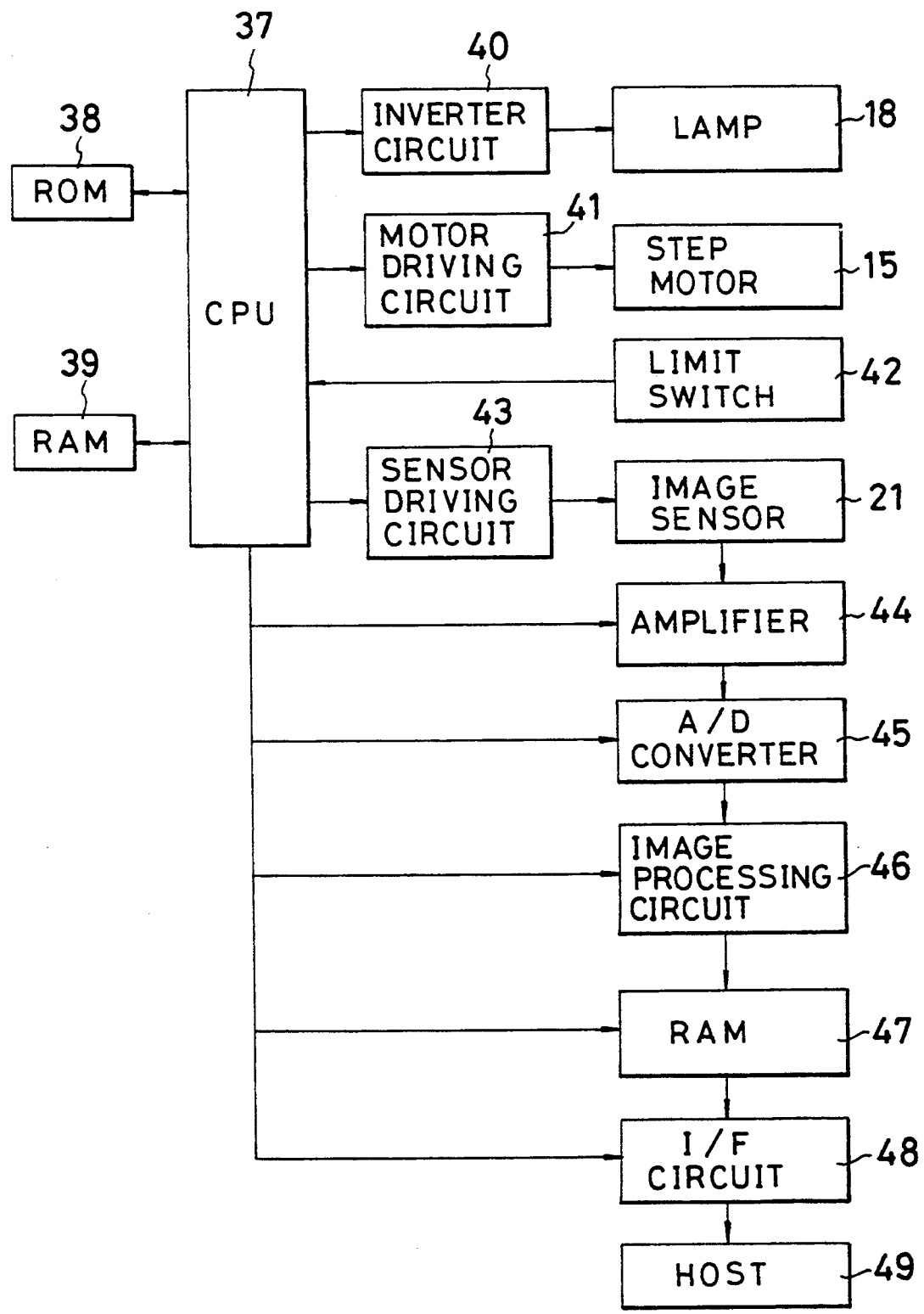
FIG. 7 is a block diagram of an electronic circuit.

Referring now to FIG. 7, there is illustrated an electronic circuit. To a CPU 37 are connected a ROM 38 with a program written therein, a RAM 39 for storing variable data, an inverter circuit 40 for driving the lamp 18, a motor driving circuit 41 for driving the step-motor 15, a limit switch 42 positioned near the film insertion opening 4 to detect a return motion of the carrier 14, and a sensor driving circuit 43 for driving the image sensor 21. Further, an amplifier 44, an A/D converter 45, an image processing circuit 46, a RAM 47 for storing read data temporarily and an I/F circuit 48 are successively connected onto the output side of the image sensor 21 and also connected to the CPU 37. The output side of the I/F circuit 48 is connected to a host computer.

In the above construction, the slide 50 is inserted from the film insertion opening 4, supported by the receptacle portion 27 of the carrier 14 and pressed by the second plate spring 31 of the pressing member 28.

Figure 4:
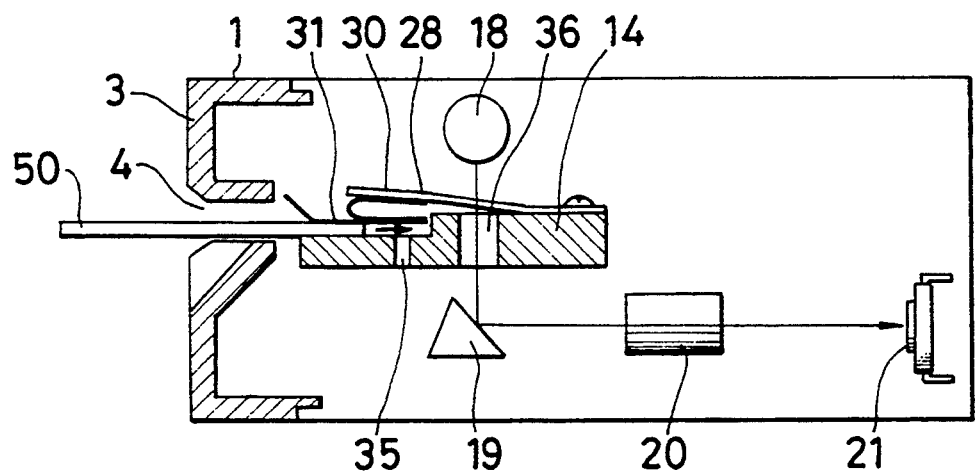
FIG. 4 is a side view in longitudinal section showing the state of the apparatus during shading correction and magnification correction.
Figure 5:
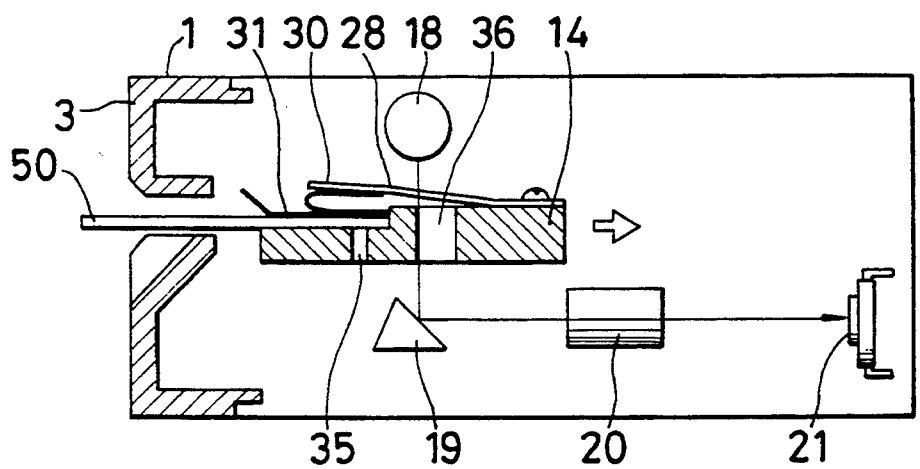
FIG. 5 is a side view in longitudinal section showing the state of the apparatus at the time of detection of a reading start position.
Figure 6:
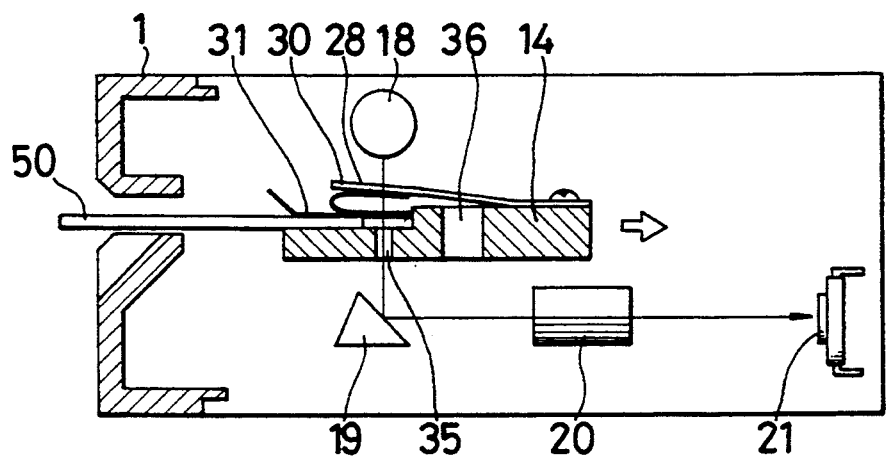
FIG. 6 is a side view in longitudinal section showing the state of the apparatus at the time of detection of an inserted slide.
Figure 8:
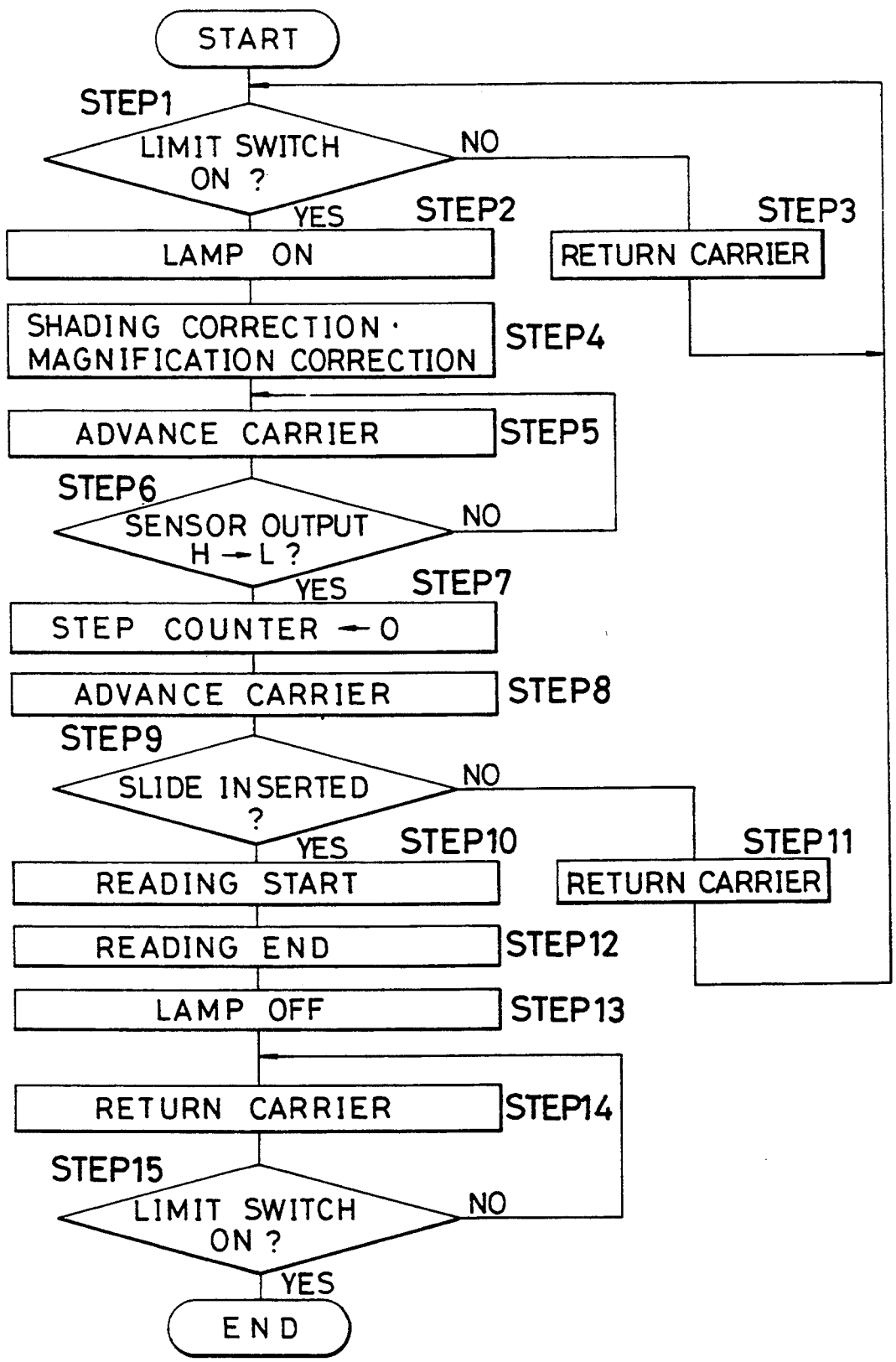
FIG. 8 is a flowchart showing slide reading operations.

Reading operations will now be described with reference to the flowchart of FIG. 8. Upon application of power or receipt of a scan command, the CPU 37 checks whether the limit switch 42 is ON and turns ON the lamp 18 if the limit switch is ON. On the other hand, when the limit switch 42 is OFF, the CPU 37 causes the step-motor 15 to rotate in reverse, thereby causing the carrier 14 to return to the film insertion opening 14 side. As shown in FIG. 4, the light from the lamp 18 passes through the light transmission window 36 and is reflected by the mirror 19, then focused on the image sensor 21 by the converging lens 20. On the basis of the output of the image sensor 21 at this time there are performed shading correction and magnification correction in step 4. This step 4 corresponds to a shading correction means and a magnification correcting means. During this period, the carrier 14 moves forwards away from the film insertion opening 4, so that as shown in FIG. 5 the light from the lamp 18 passes an edge portion of the light transmission window 36 and just thereafter the light from the lamp 18 to the mirror 19 is shielded by the carrier 14. At this instant, the output level of the image sensor 21 changes from H to L and on the basis of this change a step counter is set to zero. The carrier 14 further advances and the slide detecting apertures 35 pass under the lamp 18. At this time, whether the insertion of the slide 50 relative to the carrier 14 is proper or not is detected. More specifically, as shown in FIG. 6, if the light from the lamp 18 passes through both right and left slide detecting apertures 35, it is detected that the slide 50 has not been inserted yet, in accordance with the output of the image sensor 21, while if the light from the lamp 18 passes through only one slide detecting aperture 35, it is detected that the slide 50 has been inserted inclinedly, in accordance with the output of the image sensor 21. In this case, in accordance with this detected signal the step-motor 15 rotates reversely to return the carrier 14. If the right and left slide detecting apertures 35 are closed with the frame 52 of the slide 50, the output level of the image sensor 21 is kept low, so it is judged that the slide has been inserted properly, and when the count value of the carrier counter has reached a certain value, the reading of an image on the film 51 is started. That is, step 10 in the flowchart of FIG. 8 corresponds to a reading start time setting means for setting a reading start time. At this time, the count number of the step counter is based on the time (the time when the step counter was set at zero in step 7) when the output level of the image sensor 21 has changed from H to L upon passage of the edge portion of the light transmission window 36 through the optical axis of the lamp 18. Further, when the reading is over upon arrival of the count number of the step counter at a certain value, the lamp 18 is turned OFF and the step motor 15 is rotated reversely to return the carrier 14 until the carrier 14 interferes with the actuator of the limit switch 42 to turn ON the latter. In this case, the reading start time is set on the basis of the time when the light passing through the light transmission window 36 for shading correction and magnification correction, so it is not necessary to accurately determine the position where the carrier 14 is to be returned. Therefore, the limit switch 42 is merely required to function to prevent overrun of the carrier 14. The limit switch 42 may have a rough hysteresis characteristic and it is not necessary to determine its mounting position precisely. Consequently, it is possible to attain the reduction of cost.

Thus, since the film insertion opening 4 is formed in the front face of the support 1, the slide 50 can be inserted and pulled out by utilizing the wide outer space. As a result, it becomes possible to reduce the inner space with respect to the film insertion opening 4 and hence the apparatus can be disposed in a small space when mounted as a system into an electronic equipment. Further, by disposing the lamp 18 and the mirror 19 on both sides of the conveyance direction of the carrier 14 in opposed relation to each other and also by making the size of the receptacle portion 27 of the carrier 14 in the direction of the inner part smaller than the length A of the frame 52 of the slide 50 it is possible to effectively shorten the moving distance of the carrier 14 and the size in the direction of the inner part of the support 1. Besides, since the film insertion opening 4 is formed in the front face of the casing 6, when the casing is mounted into an electronic equipment, other electronic devices or articles can be put on the upper surface of that electronic equipment, and thus a narrow mounting place can be utilized effectively.

Moreover, all the components of the optical reader means 22 can be hidden in the interior of the support 1 and thereby protected. And it is possible to eliminate the influence of external light on the reading accuracy.

Further, since the first plate spring 30 of the pressing member 28 is formed of a thick material, it is possible to enhance the pressing force for the slide 50. Moreover, since the second plate springs 31 formed of a thin material are fixed on both sides of the first plate spring 30 and each have the U-shaped elastic portion 32 and the flat pressing surface 33, it is possible to bend the elastic portion 32 and bring the whole pressing surface 33 into close contact with the frame 52, whereby the slide 50 can be held positively despite the short length B. Additionally, since the inclined surface 34 is formed at the front end of each second plate spring 31, it is possible to prevent bending or breakage of the front edge of the frame 52.

Figure 9:
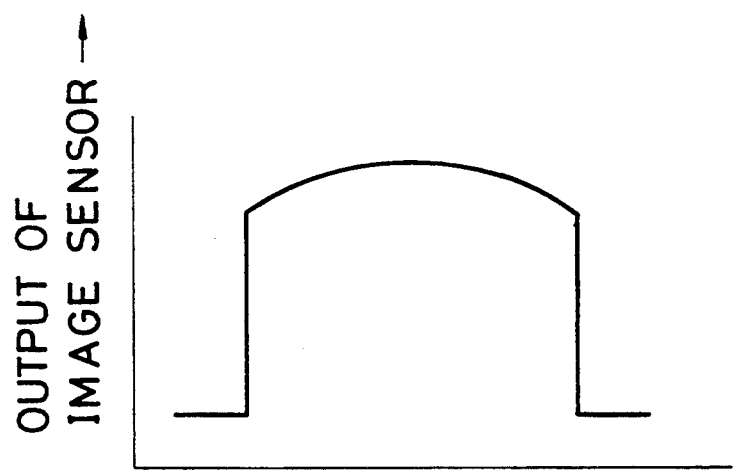
FIG. 9 is a graph showing an output distribution of an image sensor corresponding to the width of a light transmission window.
Figure 10:
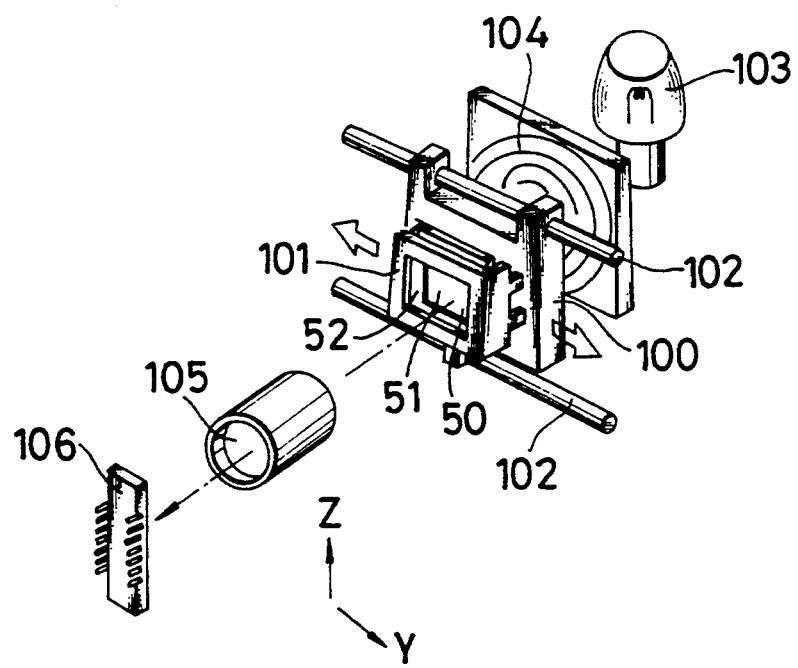
FIG. 10 is an exploded perspective view of an internal structure, showing an example of a conventional image scanner for film.
Figure 11:
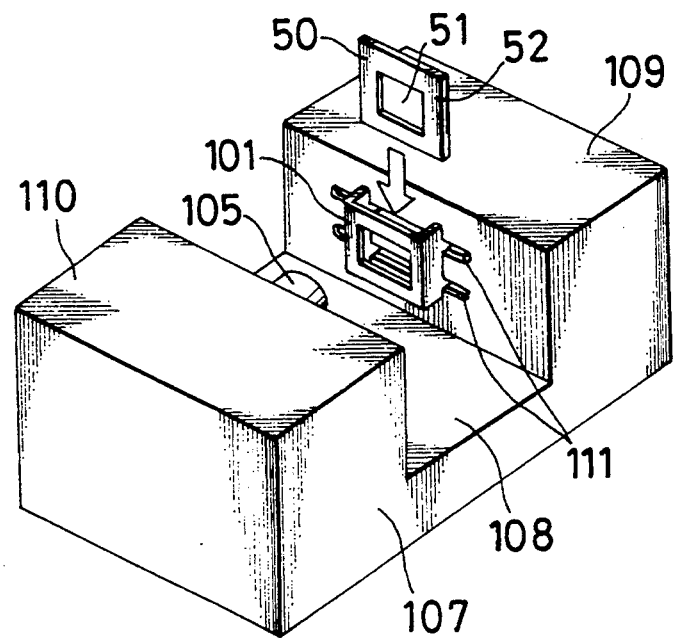
FIG. 11 is a perspective view showing an entire appearance thereof.
Figure 12:
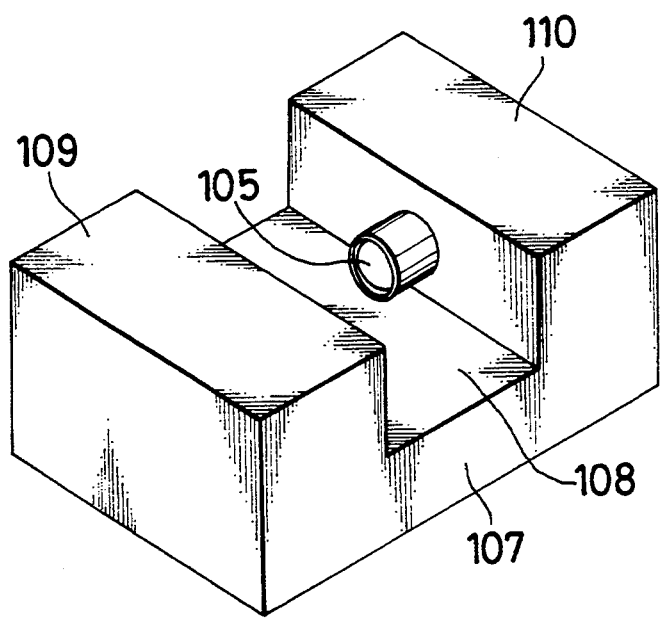
FIG. 12 is a perspective view thereof as seen in another direction.

Shading correction will now be described. The output distribution on the image sensor 21 of the light which has passed through the light transmission window 36 is of a shape wherein the height is large at the central part and gradually becomes smaller toward both ends, as shown in FIG. 9. Therefore, if the output result of the image sensor 21 is directly outputted as read data, the light and shade are no longer uniform for each light sensing element of the image sensor 21 and hence it is impossible to read the image on the film accurately. Also, an output error sometimes occurs delicately for each light sensing element of the image sensor 21. For this reason it is necessary to make shading correction.

Further, the film 51 decreases about 50–60% the quantity of light emitted from the lamp 18 even at the transparent portion thereof. If the gain of the image sensor 21 at this time is set at an appropriate value, then assuming that the light transmission window 36 does not have the filter 36a, the quantity of light passing through the light transmission window 36 is increased at the time of shading correction and the output of the image sensor 21 is saturated, so the correction standard becomes vague. In shading correction, therefore, the light from the lamp 18 is passed through the filter 36a to attenuate the quantity of light by about 50–60%, whereby at the time of shading correction a high output is obtained from the image sensor 21 in an unsaturated state and it is possible to make the correction properly. Also at the time of image reading, a high output is obtained from the image sensor 21 and it is possible to read the image on the film 51 while keeping both S/N ratio and graduation accuracy high. Besides, shading correction can be made using as the correction standard the output of the image sensor 21 corresponding to the quantity of light from the lamp 18 passing through the light transmission window 36 during movement of the carrier 14, whereby shading correction can be made always accurately just before the start of reading under various conditions, including the quantity of light at that time, reflectivity of the mirror 19 and sensitivity of the image sensor 21. Further, by merely once loading the slide 50 to the carrier 14 through the film insertion opening 4 for reading, it is possible to effect both shading correction and reading in a continuous manner and thus the operation is easy.

The following description is now given on the correction of the imaging magnification of the optical system. The reason why the correction of the imaging magnification is necessary is that a limit is encountered in enhancing the accuracy of the imaging magnification of the optical system and hence it is impossible to maintain the imaging magnification in an ideal state. In this embodiment, the correction of the imaging magnification is performed in the following manner. First, since the width of the light transmission window 36 and the imaging magnification of the optical system are known, the number of picture elements which should be present between the L-H boundary line of the output at both ends of the image sensor 21 and the H-L boundary line thereof, can be calculated as follows. Assuming that the width of the light transmission window 36 is W, the imaging magnification of the optical system is B and the picture element pitch of the image sensor 21 is d, the number of picture elements is $W \times B/d$. On the other hand, the output distribution of the image sensor 21 is of such a shape as illustrated in FIG. 9, as previously noted. But if there occurs an error in the imaging magnification of the optical system, the shape of both ends in that output distribution varies. Thus, there arises a difference between the actual number of picture elements and the calculated one. Therefore, on the basis of the actual position of the optical system, including the lamp 18, mirror 19 and lens 20, relative to the image sensor 21, the number of picture elements obtained from the output of the image sensor 21 corresponding to the light transmitted through the light transmission window 36 and the number of picture elements obtained under ideal conditions by calculation are compared with each other to determine a magnification correction coefficient, and on the basis of this magnification correction coefficient there is made a magnification correction by a signal processing such as a linear interpolation. It is not that the actual imaging magnification of the optical system is thereby corrected, but an apparent imaging magnification in the image sensor 21 is corrected and eventually the imaging magnification of the optical system is corrected.

Even when a pair of right and left light transmission windows are formed as holes or notches only in both-side portions of the carrier 14 corresponding to the portions where the output level of the image sensor 21 is at the boundary of L and H and the light from the lamp 18 is shielded between those light transmission windows, there can be attained the same object.

Although in the above embodiment the peripheral portion of the film is held by the frame 52, the film 51 may be loaded to the carrier 14 directly. Further, as the conveyance means for the slide 50 there may be used a belt and this belt may be provided with a holder portion for the slide 50.

A second embodiment of the present invention will now be described. The same portions as in the first embodiment will be indicated by the same reference numerals and explanation thereof will be omitted (this also applies to a third embodiment). In this embodiment, the light transmission window 36 is not provided with the filter 36 and there is used a light quantity changing means for changing the quantity of light emitted from the lamp 18. The light quantity changing means comprises the inverter circuit 40, the program written in the ROM 38 and the CPU 37.

In such construction, when shading correction is to be made, an instruction is issued from the CPU 37 to the inverter circuit 40 to the effect of decreasing the driving power to the lamp 18 in accordance with the program written in the ROM 38. As a result, the driving power for the lamp 18 is decreased and the power of the lamp 18 is decreased about 50–60% of the power thereof in a normal operation. Then, at the time of reading the image on the film 51, the power of the lamp 18 is again increased to maintain the quantity of light in a normal operation. As a result, a high output is obtained from the image sensor 21 in an unsaturated state at the time of shading correction and there can be made proper correction, while also at the time of image reading, a high output is obtained from the image sensor 21 and the image on the film 51 can be read in an enhanced state of both S/N ratio and gradation accuracy.

A third embodiment of the present invention will now be described. In this embodiment, the light transmission window 36 is not provided with the filter 36a and there is used an output changing means for the image sensor 21. This output changing means comprises the sensor driving circuit 43, the program written in the ROM 38 and the CPU 37.

In such construction, by the output changing means the gain of the image sensor 21 is decreased to about 50–60% in shading correction and is returned to 100% at the time of reading the image on the film 51. Therefore, like the first and second embodiments, in shading correction, a high output is obtained from the image sensor 21 in an unsaturated state and there can be made a proper correction, while also at the time of reading the image on the film 51, a high output is obtained from the image sensor 21 and it is possible to read the image in an enhanced state of both S/N ratio and gradation accuracy.

What is claimed is:

1. An image scanner for film, comprising:
 a support having a film insertion opening;
 a conveyance means, including a movable member which is movable reciprocatably between the film insertion opening and an inner portion of said support, for conveying a film which has been inserted into the film insertion opening;
 a light source for radiating light to the film being conveyed by said conveyance means, in a direction perpendicular to the film conveying direction; a refractor for refracting the light which has been emitted from said light source and passed through the film, along the film conveying direction; and
 an optical reader for receiving the light refracted by said refractor and reading an image formed on the film,
 wherein said conveyance means includes a holder portion which comprises a receptacle portion formed therein to support the peripheral edges of the film, a first plate spring attached at one end thereof to said movable member so as to be capable of rising and falling, and a pair of second plate springs, each having a first and second end, wherein said first end is attached to said first plate spring through an elastic member and said second end is formed into a flat pressing surface which resiliently contacts said receptacle portion.

2. An image scanner for film according to claim 1, the whole of which is covered with a case to shield the light.

3. An image scanner for film, comprising:
 a support having a film insertion opening;
 a movable member capable of reciprocating from the film insertion opening toward an inner portion of said support, said movable member having a holder portion for removably holding the film which has been inserted into the film insertion opening;
 a light source for radiating light to the film being conveyed by said movable member, in a direction perpendicular to the film conveying direction;
 a refractor for refracting the light which has been emitted from said light source and passed through the film, along the film conveying direction; and
 an optical reader for receiving the light refracted by said refractor and reading an image formed on the film,
 wherein the holder portion said movable member comprises a receptacle portion formed in the movable member to support the peripheral edges of the film, a first plate spring attached at one end thereof to said movable member so as to be capable of rising and falling, and a pair of second plate springs, each having a first and second end, wherein said first end is attached to said first plate spring through an elastic member and said second end is formed into a flat pressing surface which resiliently contacts said receptacle portion.

4. An image scanner for film according to claim 3, wherein said movable member has a light transmission window in a position such that the holder portion of said movable member is located between said light transmission window and the film insertion opening whereby the light from said light source passes through said light transmission window, and there is provided a reading start time setting means for setting a reading start time on the basis of a change in the output of an image sensor when said light transmission window passes across the optical axis of said light source, 5. An image scanner for film according to claim 3, wherein said movable member has a light transmission window in a position such that the holder portion of said movable member is located between said light transmission window and the film insertion opening whereby the light from said light source passes through said light transmission window, and there is provided a magnification correcting means which uses as a correction standard an output of an image sensor corresponding to the light emitted from said light source and passing through said light transmission window.

6. An image scanner for film according to claim 3, wherein said movable member has a light transmission window in a position such that the holder portion of said movable member is located between said light transmission window and the film insertion opening whereby the light from said light source passes through said light transmission window, and there is provided a shading correction means which uses as a correction standard an output of an image sensor corresponding to the light emitted from said light source and passing through said light transmission window.

7. An image scanner for film according to claim 6, wherein there is provided a light quantity changing means for changing the quantity of light emitted from said light source.

8. An image scanner for film according to claim 6, wherein a filter having a transmissivity equal to that of a transparent portion of the film is attached to said light transmission window.

9. An image scanner for film according to claim 6, wherein there is provided a means for changing the correction standard corresponding to the output of said image sensor.

* * * * *

UNITED STATES PATENT AND TRADEMARK OFFICE
CERTIFICATE OF CORRECTION

PATENT NO. : 5,371,614
DATED : December 6, 1994
INVENTOR(S) : Takuro ITO

It is certified that error appears in the above-indentified patent and that said Letters Patent is hereby corrected as shown below:

On the title page, Item [30], the Foreign Application Priority Data was omitted. It should read:

--Nov. 1, 1989 [JP] Japan........1-285214
  Nov. 28, 1989 [JP] Japan.......1-308722--

Signed and Sealed this

Twenty-first Day of November, 1995

Attest:

BRUCE LEHMAN

Attesting Officer     Commissioner of Patents and Trademarks